United States Patent [19]

Hönl et al.

[11] Patent Number: 5,299,088

[45] Date of Patent: Mar. 29, 1994

[54] PROTECTIVE CIRCUIT AND PROTECTIVE PLUG FOR TELECOMMUNICATION INSTALLATIONS

[75] Inventors: Robert Hönl; Klaus-Peter Achtnig, both of Berlin, Fed. Rep. of Germany

[73] Assignee: Krone AG, Berlin, Fed. Rep. of Germany

[21] Appl. No.: 738,185

[22] Filed: Jul. 30, 1991

[30] Foreign Application Priority Data

Aug. 14, 1990 [DE] Fed. Rep. of Germany ....... 4026004

[51] Int. Cl.⁵ .............................................. H02H 9/06
[52] U.S. Cl. .................... 361/119; 361/104; 361/56
[58] Field of Search ............ 361/56, 91, 111, 117, 361/118, 119, 104, 103

[56] References Cited

U.S. PATENT DOCUMENTS 3,587,021  6/1971  Baumbach ........................ 361/119

Primary Examiner—A. D. Pellinen
Assistant Examiner—S. Jackson
Attorney, Agent, or Firm—McGlew and Tuttle

[57] ABSTRACT

The invention relates to a protective circuit for the protection of the user from overvoltage and overcurrent, in particular for telecommunication installations. Prior art protective circuits comprise a fuse connected into the line connection, and a surge arrester with a heat-sensitive protection device, forming a cross path between the current path of the line connection and the earth conductor, the heat-sensitive protection device disconnecting the cross path in case of excessive power, and connecting it to the earth conductor.

In the protective circuit according to the invention, a response of the heat-sensitive protection device (5, 6) will cause disconnection of the cross path of the surge arrester (1, 2) and closing of a short-circuit cross path (7, 8) behind the fuse (3, 4) between the line connection (a, a'; b, b') and the earth conductor (E). The protective circuit can be accommodated in a miniature plug for application in telecommunication installations.

14 Claims, 6 Drawing Sheets

FIG.11

PROTECTIVE CIRCUIT AND PROTECTIVE PLUG FOR TELECOMMUNICATION INSTALLATIONS

FIELD OF THE INVENTION

The invention relates to a protective circuit for the protection of the user from overvoltage and overcurrent, in particular for telecommunication installations, and more particularly to a protective device including a fuse connected into a line connection and a surge arrester protected by a heat-sensitive protection element and forming a cross path between the line connection and the earth conductor.

BACKGROUND OF THE INVENTION

From VDE 0845, part 1, October, 1987, protective circuits are known in the art, wherein each cable conductor is protected by a surge arrester to earth. In order to protect the surge arrester from damages due to permanent current loads, the surge arrester is frequently provided with a heat-sensitive protection device short-circuiting the surge arrester in cases of excessive heating. Since the cable conductor may be damaged by the short-circuit current, a melt fuse is incorporated in series with the surge arrester. This melt fuse cuts the current conduction off at high current flow levels. It is disadvantageous, herein, that such fuses must be resistant against surge currents so to stand the surge currents existing in normal operating conditions, and for this purpose, the fuses have to be rather voluminous.

From German publication DE-OS 38 31 935, there is known in the art a protective circuit, also comprising a fuse in the cable conductor and a cross path between cable conductor and the earth conductor connected behind the fuse. The cross path is composed of a surge arrester and heat-sensitive protection device thermally coupled therewith. An excessive thermal load on the surge arrester will lead to a response from the heat-sensitive device, disconnecting the cross path. With permanent current load, the fuse will disconnect the current conduction. Thus, the system side is not protected anymore from short overvoltages, therefore, if the fuse does not disconnect, it will be loaded with the overcurrent until disconnection occurs. The fuse has to be, therefore, resistant against surge currents, which requires a large volume. After a response from the heat-sensitive protection device and of the subsequent disconnection of the fuse, if any, the input of the system side will no longer be on a defined potential, so that the destruction of sensitive components cannot be excluded.

SUMMARY OF THE INVENTION

It is an object of the invention, therefore, to provide a protective circuit for the protection from overvoltage and overcurrent, which protects the surge arrester from excessive thermal loads, and which disconnects current conduction in case of excessive current loads in a way that is safe for the system side, and will prevent the risk of fires.

According to the invention, a protector is provided with a circuit for protection from overvoltage and overcurrent situations for telecommunication installations. A fuse is provided and connected into a line connection (a line between line side and system side). A surge arrester is provided and protected by a heat sensitive protective device. The surge protector forms a cross path between each line connection and an earth conductor. The heat sensitive protection element causes a disconnection of the cross path of the surge arrester and a closing of a short-circuit cross path between the line connection and the earth conductor, behind the fuse. The cross path of the surge arrestor is preferably arranged in front of or before the fuse relative to the direction of line side to system side (1-s). The cross path of the surge arrester and the short-circuit cross path may also both be provided behind the fuse in which case the fuse may be bridged by a switch which if disconnected when disconnecting the cross path of the surge arrester. The protective circuit comprises a fuse connected in series with the current line. A short-circuit cross path is connected between the current line and the earth line. The short-circuit cross path is provided with a heat-sensitive protection device and is located, relative to the direction line side/system side, behind the fuse. The cross path is open in the operating condition. When overvoltages exist for an excessive period of time, the surge arrester will heat up and thus will operate the heat-sensitive protection device. The latter disconnects the cross path of the surge arrester, and simultaneously closes the short-circuit cross path behind the fuse. The current line can then be disconnected by the fuse. Due to the short-circuit cross path, the input of the system side is then on a defined potential, namely earth.

With inadmissibly high current loading, which may occur, e.g., with an overvoltage on the current line, without the surge arrester being tripped, the current line is disconnected. Since, in this case, the heat-sensitive protection device does not respond, the short-circuit cross path is not closed, so that here, too, no risk of fire exists due to excessive currents in the short-circuit line.

If, the branch of the cross path of the surge arrester is arranged before the fuse, relative to the direction line side-system side, the fuse is not loaded by current surges and may be kept small. When the heat-sensitive protection device is operated, the short-circuit cross path behind the fuse is closed, so that the latter will open the current line for correspondingly high currents. Since tripping of the heat-sensitive protection device causes opening of the cross path of the surge arrester, another operation of the surge arrester is prevented.

The cross path of the surge arrester and the short-circuit cross path are preferably disposed behind the fuse being bridged by a short-circuit, which is separated when disconnecting the cross path of the surge arrester. Herein, the surge current load is also kept away from the fuse. The latter is disposed before the branch of the surge arrester and of the open short-circuit cross path, and is parallelly bridged with a short-circuit switch, so that, in operating condition, only the smaller portion of the current flows through it. Tripping of the heat-sensitive protection device will lead to an opening of the short-circuit, bridging the fuse, and to a closing of the short-circuit cross path between current line and earth line, so that the fuse is activated.

The protective circuit may be symmetrically doubled for protecting two current lines of a double conductor, wherein, upon operation of a heat-sensitive protection device, both surge arresters are disconnected from the earth line over a common change-over switch, and both short-circuit cross paths are closed. Herein, the protective circuit is mounted into a double conductor as it is commonly done in the telecommunication sector. Between each of the two current lines and the common earth line, the protective function is achieved such that, upon tripping of only one heat-sensitive protection device, the common safety function is activated, both surge arresters are disconnected from the earth line, and both short-circuit cross paths are closed. Instead of two separate surge arresters, a three-pole surge arrester can also be employed.

The protective circuit may further be provided with a fine protection, so that according to VDE 0845, part 1, October, 1987, a stage-type protection by coarse and fine protection is obtained. The fine protection preferably comprises a PTC resistor (PTC=positive temperature coefficient) and a varistor being closely coupled thermally. Such devices are known in the art from German publication DE-OS 32 31 066. Such fine protection permits protection from quick transient events and from overvoltages and overcurrents, where the coarse protection does not respond. The voltage-dependent resistor (varistor) guarantees limiting the voltage to the desired maximum level, and operates very quickly with response times in the order of nanoseconds. The temperature-dependent PTC resistor in the longitudinal branch serves for decoupling between the voltage limits in the coarse protection from those in the fine protection. Further, the PTC resistor serves for limiting currents in time, which are larger than the common and admissible operating currents by the heating-up of the PTC resistor due to the current flowing. Finally, the PTC resistor serves for overload protection of the voltage limiting in the fine protection (varistor), on one hand, by self-heating of the PTC resistor by the current flowing, with the increase of the resistance resulting therefrom, and, on the other hand, by the increase of the resistance due to the heating-up of the PTC resistor by the thermal coupling of the PTC resistor with the varistor.

Providing a measuring and disconnecting position behind the stage protection permits a partial testing of the functions of the protective circuit and of the current line with incorporated protective circuit. In the telecommunication sector, it is particularly advantageous to adapt such protective circuits as protective plugs.

Further advantageous embodiments of the invention, in particular of the structure of the protective circuit as a protective plug are pointed out in the description which follows.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
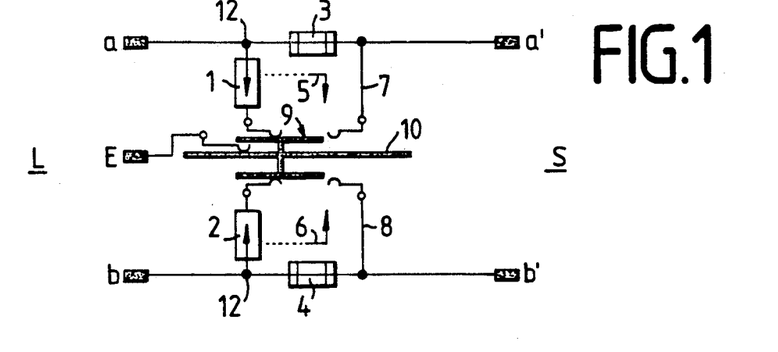
FIG. 1 is a circuit diagram of a first embodiment of the protective circuit according to the invention with a fuse arranged therebehind for application in double conductors, in the operating condition.

Referring to the drawings and in particular to FIG. 1, there is shown a protective circuit, arranged between the terminals a-a' and b-b' of line side L and system side S, respectively. A common earth conductor E is provided for carrying overcurrents off, which are generated by overvoltages referenced to the earth potential. The protective plug comprises two surge arresters 1 and 2, being connected as cross paths between the terminals a and E or b and E, respectively. Fuses 3, 4, are connected in the connection lines between the terminals a, a' or b, b', behind the branches 12 of the surge arresters 1, 2. The surge arresters 1, 2 are thermally controlled by heat-sensitive protection devices 5, 6. FIG. 1 shows the protective circuit in operating condition, i.e. the usage arresters 1, 2 contact a change-over switch 9, which is connected over a base 10 with the earth line E. The short-circuit cross paths 7, 8 are opened, and are, in operating condition, not connected with the change-over switch 9. Overvoltages occurring for a duration of time which is sufficient to trip the surge arresters with the resulting overcurrent. The fuses 3, 4 are, therefore, not loaded with the surge currents.

Figure 2:
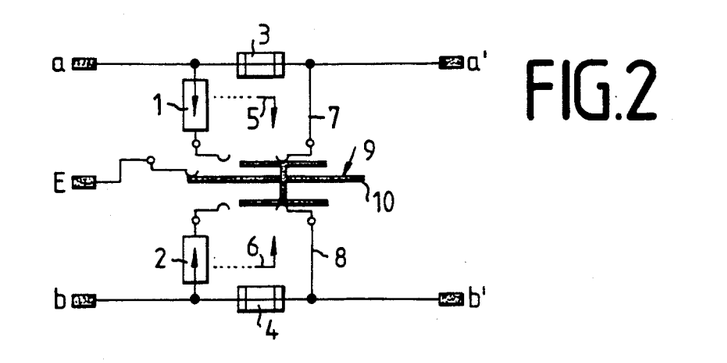
FIG. 2 is a circuit diagram of the protective circuit according to FIG. 1 in a tripped condition.

In FIG. 2, the protective circuit according to FIG. 1 is represented showing tripped fuse operation. An excessive thermal load of one of the two surge arresters, 1, 2, i.e. an excessive current load, will operate the corresponding heat-sensitive protection device 5 or 6, respectively. This causes an operation of the common change-over switch 9. This is shown here by the displacement of base 10 toward the right. Thereby, the short-circuit cross paths 7 and 8 are connected to the earth line, and are closed. The cross paths of the surge arresters 1 and 2 are disconnected. The fuses 3, 4 are activated now, and can disconnect the current lines between the terminals a, a' and b, b'. The terminals a', b' of the system side S are now on a defined potential, namely the earth potential, so that protection of personnel and of sensitive electronic circuitry on the system side S is guaranteed. A risk of fire, as otherwise possibly caused by the protective circuit, is also prevented.

Figure 3:
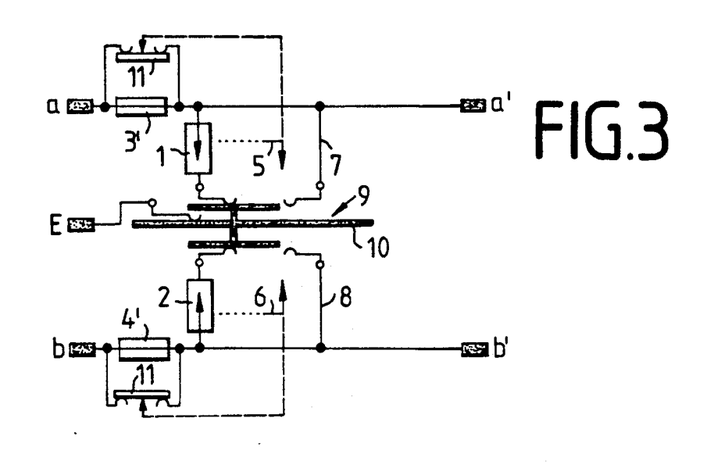
FIG. 3 is a circuit diagram of a second embodiment of the protective circuit according to the invention with a bridged fuse arranged therebefore.

FIG. 3 shows another embodiment of the protective circuit with a modified arrangement of the fuses 3', 4'. A fuse 3' is arranged in the line connection between the terminals a, a' before the cross path of the surge arrester 1. The short-circuit cross path 7 arranged behind thereof is open in operating condition, whereas the cross path of the surge arrester 1 contacts the change-over switch 9, which is connected with the earth line E. The fuse 3' is short-circuited, in this short-circuit a closed switch 11 being incorporated. The heat-sensitive protection device 5 acts upon the change-over switch 9 and the switch 11 such that tripping of the heat-sensitive protection device 5 will cause opening of the cross path of the surge arrester 1 and closing of the short-circuit cross path 7. Simultaneously, the switch 11 in the short-circuit of the fuse 3' is opened, so that the fuse 3' is activated over the short-circuit cross path 7.

Figure 4:
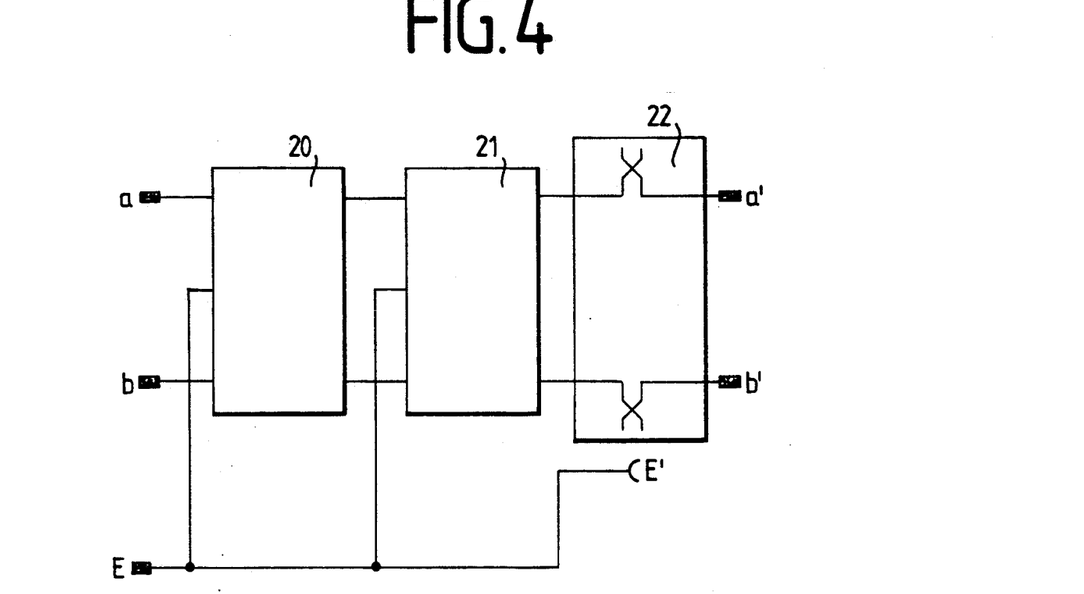
FIG. 4 is a circuit diagram of a third embodiment of the protective circuit according to the invention as stage type protection with a measuring and disconnecting position.

The partitioning of the protective circuit into a coarse protection 20 and a fine protection 21 in the form of a stage-type protection is shown by the protective circuit according to FIG. 4. This stage-type protection is extended by a measuring and disconnecting position 22 connected behind thereof.

Figure 5:
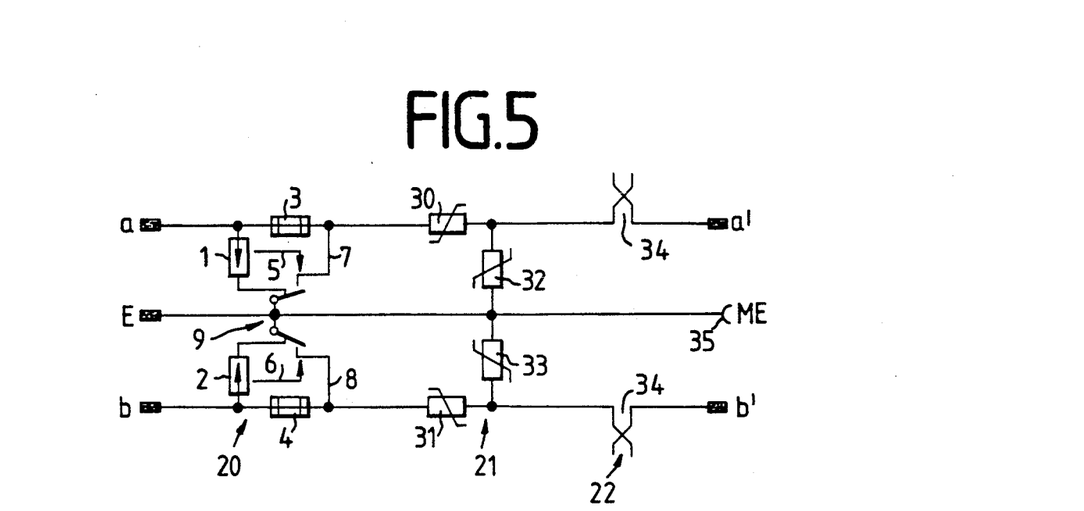
FIG. 5 is a circuit diagram showing the stage type protection.

FIG. 5 shows another embodiment of the stage-type protection with measuring and disconnecting position 22. The coarse protection 20, the subsequent fine protection 21 and the subsequent measuring and disconnecting positions 22 existing in each line connection are disposed into the double conductor of the line connections between the terminals a, a' and b, b' with the earth conductor E. The coarse protection 20 is formed by the cross paths of surge arresters 1 and 2, the subsequent fuses 3, 4 provided in the line connections, the short-circuit cross paths 7, 8, the heat-sensitive protection devices 5, 6 and the common change-over switch 9. The subsequent fine protection 21 is composed of PTC resistors 30, 31 provided in the respective line connections, and of the varistors 32, 33 following thereupon. The varistors are connected between the respective line connections connecting terminals a, a' and b, b' and the earth conductor E. The earth potential is lead outside as another measuring position 35, so that potential measurements between the measuring and disconnecting positions 34 and the measuring position 35 for the earth potential are possible.

Figure 5A:
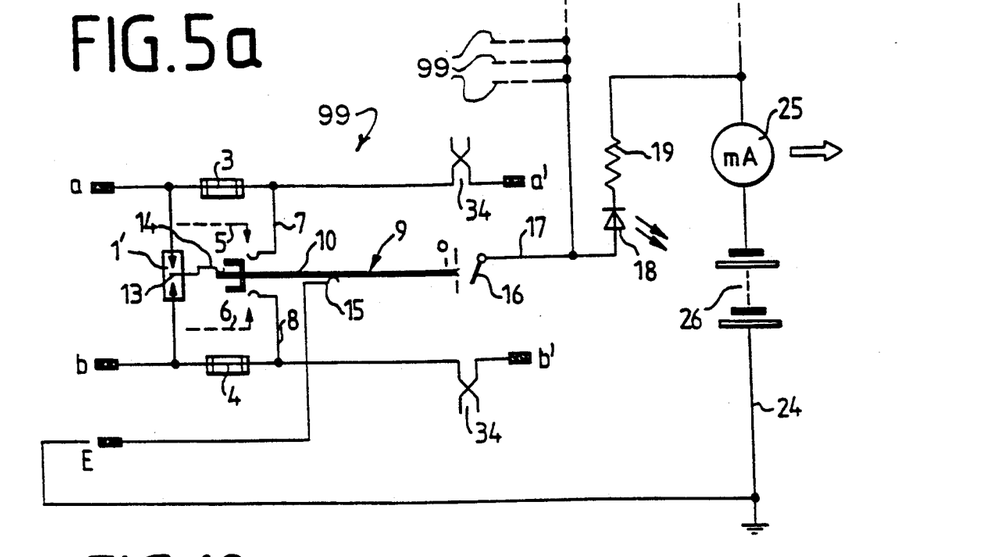
FIG. 5a is a circuit diagram of a fourth embodiment of the protective circuit according to the invention.

FIG. 5a shows another embodiment of the protective circuit with a signalling device. The protective device comprises a three-pole pole surge arrester 1' between the line connections of the terminals a, a' and b, b'. A central electrode 13 is connected over a slide contact 14 with the change-over switch 9 adapted as a slider 15 and being at earth potential. The fuses 3, 4 are provided in the line connections behind the cross path of the three-pole surge arrester 1'. The heat-sensitive protection devices 5, 6 and the short-circuit cross paths 7, 8 are provided in the same construction as in the previous embodiments. The earth conductor E contacts the change-over switch 9 over a slide contact 15. The measuring and disconnecting positions 34 in the line connections between the terminals a, a' and b, b' are provided as well.

At the end of the change-over switch 9, there is mounted a contact maker 16, the connection line 17 of which may be connected with further protective plugs 99 and leads to an electronic signal transducer 18 connected over a resistor 19 to a line 24, wherein a signal transducer 25 for a central signal and an exchange battery 26 is provided. The protective circuit permits a central signal to be issued, whether or not a protective plug 99 has been tripped in a protected field, e.g. of a main distribution frame of the communication system. The free end of the change-over switch 9 serves, herein, as a signalling lug 56, which will, with tripped protective plug 99, come into contact with the contact maker 16 and will also accept the earth potential. If the circuit is thereby closed over the local signalling transducer 18, then the tripping condition of the protective plug 99 can be indicated at the main distribution frame or in a field, and, if applicable, also at a connector block, by a lamp, LED, buzzer or by another signalling device. Contact making need not be permanent, but may have a type of trigger function. If applicable, the power supply of the signalling device can be performed over a DC/DC converter, since the protective earth may accept a high potential. Through interfaces to counting mechanisms, heavily loaded current lines, e.g. with frequent tripping, can be discovered.

Figure 6:
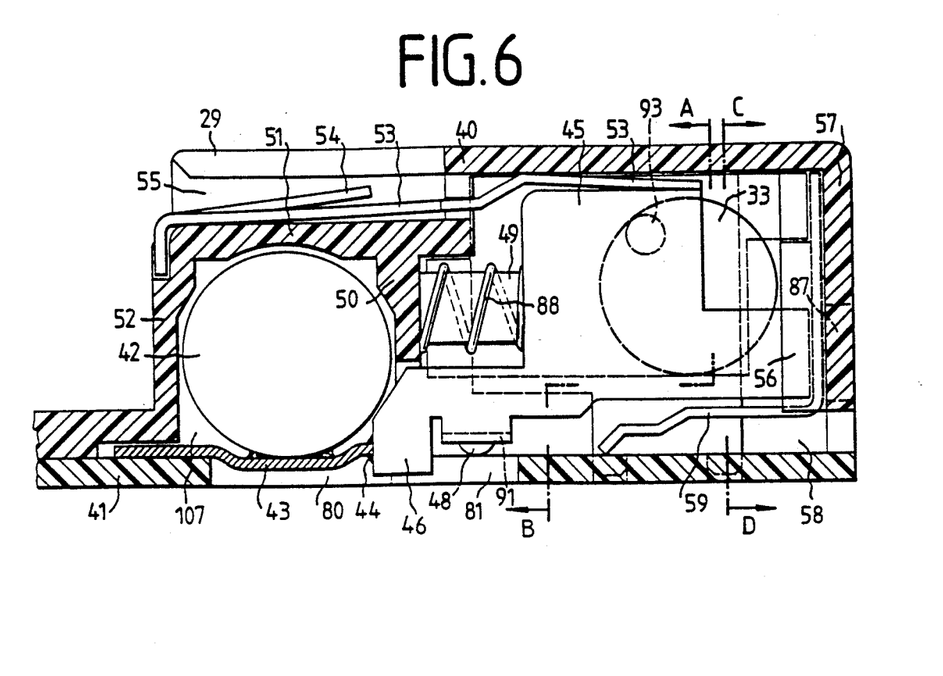
FIG. 6 is a longitudinal sectional view taken through the protective plug according to the invention.

FIG. 6 shows a central longitudinal section through a protective plug 99 adapted as a miniature plug provided with a protective circuit. The protective circuit is adapted as a stage-type protector with measuring and disconnecting position 22 (see FIG. 4 and 5). The miniature switch finds its applications particularly in the telecommunication sector.

An external housing 40, the lower section of which is formed of a circuit board 41, includes a three-pole surge arrester 42. The central electrode of the three-pole surge arrester 42 contacts a sheet-metal part 43. The sheet-metal part 43 is conductively connected, over a fusible connection such as a solder connection 44, with metal slider 45 at a lug 46 extending downwardly. The lug 46 is guided in a guide slot 81 at the circuit board 41. The slider 45 rests with contact projections 47, 48, one of which only is visible in FIG. 6, on the circuit board 41. The slider 45 is spring-loaded on a side directed toward the surge arrester 42 by means of a spring 88 mounted on a guide pin 49. The spring 88 is supported, on the other side, by an internal housing top wall 51 and a left-hand transverse wall 52 of the housing 40. In FIG. 6, a cavity 107 for receiving the surge arrester 42, is defined by the walls 50, 52 and the top wall 51. The slider 45 is contacted, at its top, by an earth plate 53 adapted as a resilient member. The latter is located in a hollow section 55 being formed by the internal top wall 51 and the external top wall 29 of the housing 40. The external top wall being open toward the external transverse wall 52 of the housing 40 and serving for receiving an earth plug or an earth rail 98, respectively. For safe contacting, the earth plate 53 is provided, in the hollow section 55, with a spring tongue 54.

The slider 45 forming the change-over switch 9 comprises, at its side turned away from the spring 88, a signalling lug 56, which, with a tripped safety function, passes through an opening 87 of the right-hand transverse wall 57 of the housing. Therein, another opening 58 is provided, said opening being limited by the circuit board 41. This opening 58 serves for receiving a non shown measuring and disconnecting plug, and comprises spring tongues 59, 60 contacting the circuit board 41 in normal condition, i.e. without a measuring and disconnecting plug being introduced.

Figure 7:
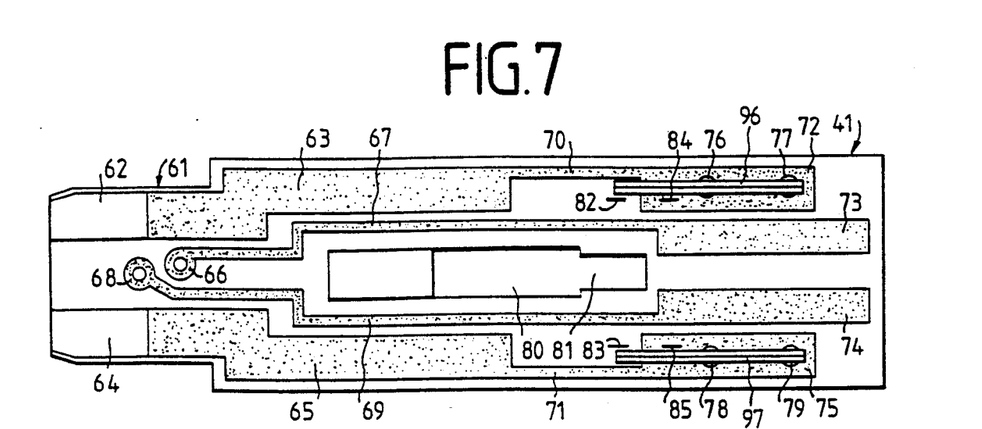
FIG. 7 is a top view of a circuit board of the protective plug according to the invention.

FIG. 7 shows the circuit board 41 being part of the housing 40 of the protective plug 99, and being adapted, at its left-hand end, as a contact tongue 61. On the shown side of the circuit board 41, contact areas 62, 64 are provided for contacting the line-side terminals a, b, and which are followed by external circuit tracks 63, 65. On the opposed side of the circuit board 41, identical contact areas for contacting the system-side terminals a', b' are provided. These are connected, over through-contacts 66, 68, with the circuit tracks 67, 69 extending internally in parallel to the circuit tracks 63, 65. In the incoming circuit tracks 63, 65, there are narrow sections 70, 71 forming the fuses.

The circuit tracks 63, 65, 67, 69 terminate on the side of the circuit board 41 opposed to the contact tongue 61 each in rectangular, oblong contact zones 72, 73, 74, 75 (see FIG. 7). In the contact zones 72, 75, there are provided two bores 76, 77 or 78, 79 each. Such bores 76 to 79 serve for receiving vertically mounted contact plates 96, 97. Approximately in the middle of the circuit board, there is provided a recess 80 for receiving the sheet-metal part 43. Further, a guide slot 81 is provided. Guide slot 81 communicates by the recess 80 to the side of the circuit board 41 turned away from the contact tongue 61, and serves for receiving the lug 46 of the slider 45. The support positions 82, 83 mark the positions, where the contact projections 47, 48 of the slider are placed, in an operating condition. These are arranged in the area of the narrow sections 70, 71 of the circuit tracks 63, 65 serving as fuses 3, 4. Therefore, in the operating condition, the contact projections 47, 48 will not have contact with the circuit tracks 63, 65. The contact positions 84, 85 provided on the contact zones 72, 75, mark the position of the contact projections 47, 48 with tripped function of the fuses 3, 4.

The safety function of the protective circuit is tripped by the melting of the solder connection 44. This solder connection 44 connects the slider 45 with the contact plate 43 of the surge arrester 42. The contact plate 43 provides for a close thermal contact. Melting of the solder connection 44 effects, due to the pre-tensioned spring 88, a movement of the slider 45. The latter moves away from the surge arrester 42, and disconnects the contact of the surge arrester 42 with the earth plate 53. The contact projections 47, 48 leave their non-contacting support positions 82, 83 and rest, after such movement, on the contact positions 84, 85. Therefore, a direct short-circuit between the earth plate 53 and the circuit tracks 63, 65 is established, behind the narrow sections 70, 71 forming the fuses 3, 4. The signalling lug 56 projects from the opening 87 in the transverse wall 57. Its function will be described in detail hereinbelow.

Figure 8:
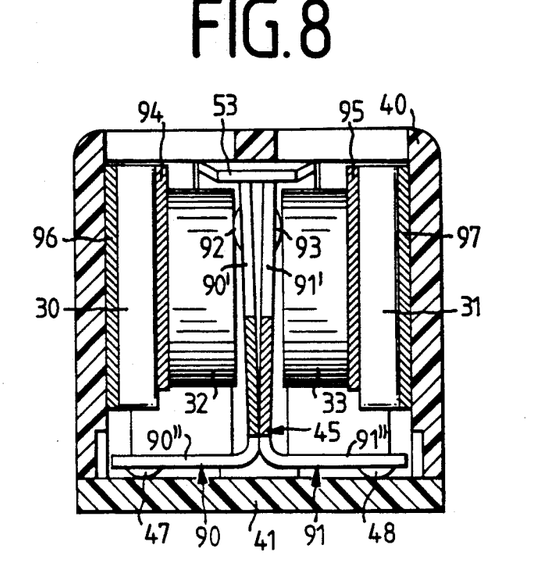
FIG. 8 is a cross sectional view taken through the protective plug along line A-B in FIG. 6.

FIG. 8 shows a section through the protective plug 99 along the sectional plane A-B in FIG. 6. The protective plug 99 is surrounded by the housing 40 and the circuit board 41. The slider 45 comprises two L-shaped metal slider portions 90, 91, which are combined to a T-piece, such that the long legs 90', 91' forming the crosspiece of the T-piece, are tensioned relative to each other, and form an acute-angled V-shaped spring. At the respective ends of the short legs 90", 91" forming the flange of the T-piece, are the contact projections 47, 48 resting on the circuit board 41. The slider 45 forming the change-over switch 9 is contacted, at its top, by means of the spring force of the earth plate 53.

At each side of the long legs 90', 91' of the slider portions 90, 91, a disc-shaped varistor 32, 33, a separating contact plate 94, 95, a PTC resistor 30, 31, and an external contact plate 96, 97 are provided. The contact projections 92, 93 press, by the spring action of the long legs 90', 91' of the slider 45, on the varistors 32, 33, and thus contact them electrically. The contact projections 92, 93 are disposed on the inner side of the long legs 90', 91' of the L-shaped slider portions 90, 91. The PTC resistors 30, 31 have a rectangular shape, and the varistors 32, 33 have a cylindrical shape, their heights being smaller than their diameters. One varistor 32, 33 each and one PTC resistor 30, 31 each are electrically connected at their base surfaces by means of a separating contact plate 94, 95. Due to the large contact areas, the thermal contact is also very good.

Figure 9:
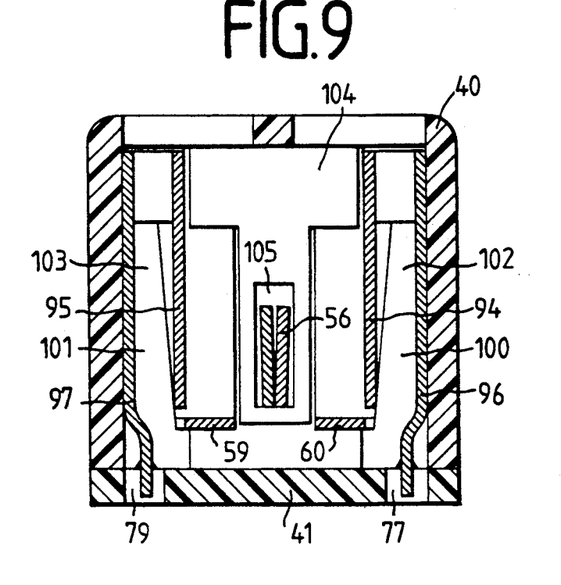
FIG. 9 is a cross sectional view taken through the protective plug along line C-D in FIG. 6.

The cross-section shown in FIG. 9 through the protective plug 99 along line C-D in FIG. 6 shows the housing 40 with the circuit board 41. The internal side walls of the housing 40 are adapted in their shape to the contact plates 96, 97. The contact plate 96 is soldered vertically into the circuit board 41, by means of the bores 76, 77, and the contact plate 97 is soldered vertically into the bores 78, 79. The contact plates 96 97 inwardly follow the hollow sections 100, 101, receiving the left-hand and the right-hand PTC resistors 30, 31. Then, these plates inwardly, follow the separating contact plates 94, 95, electrically connecting the PTC resistors 30, 31 with the varistors 32, 33. Subsequently, the receiving spaces 102, 103 for receiving the varistors 32, 33 follow. Centrally there is provided the signalling lug 56 of the slider 45. Between the receiving spaces 102, 103 for the varistors 32, 33 and the circuit board 41, the spring tongues 59, 60 of the measuring and disconnecting contacts are provided. The hollow spaces 100, 101 for receiving the PTC resistors 30, 31 and the receiving spaces 102, 103 for receiving the varistors 32, 33, of the separating contact plates 94, 95, and of the spring contact tongues 59, 60 are formed in a corresponding molded body 104, having at its front another opening 105 for passing the signalling lug 56 of the slider 45 through.

Figure 10:
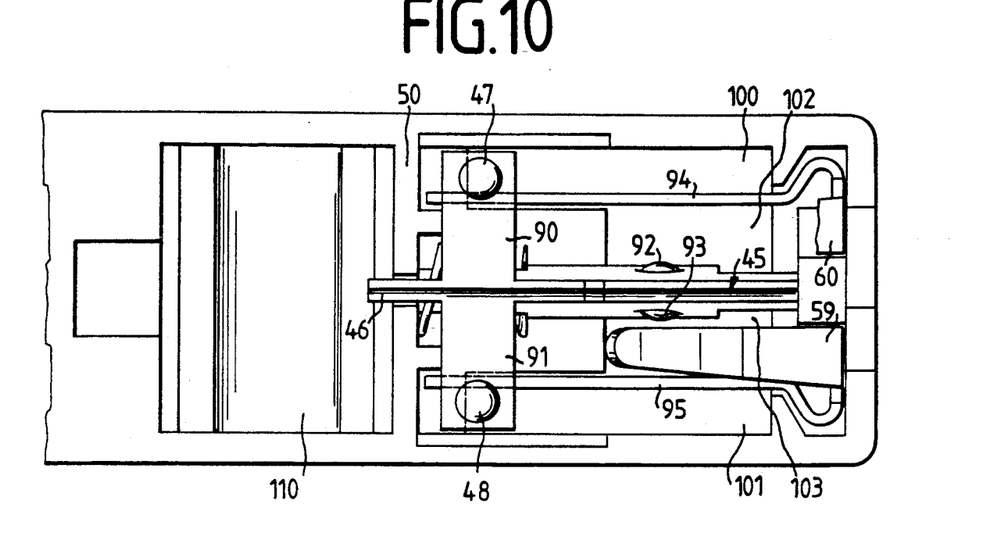
FIG. 10 is the bottom view of the protective plug with removed circuit board according to the invention.

In FIG. 10, a bottom view of the protective plug 99 is shown with the circuit board 41 removed. The contact spring tongues 59, 60 are for contacting on the contact zones 73, 74 of the circuit board, and are each rigidly connected with one of the separating contact plates 94, 95. Thereby, the connections between the line-side terminals a, b and the system-side terminals a', b' are established over the PTC resistors 30, 31, when a measuring and disconnecting plug is not employed. FIG. 10 further shows the hollow spaces 100, 101 and the receiving spaces 102, 103 for receiving the PTC resistors 30, 31 or of the varistors 32, 33, resp. Centrally, the slider 45 is provided with the contact projections 92, 93. The flange side of the slider is formed by the short legs 90", 91". At the ends thereof, the contact projections 47, 48 are attached at the bottom. The guide lug 49 of the compression spring 88 projects through the internal housing wall 50. On the other side of the housing wall 50, there is provided the receiving space 107 for receiving the three-pole surge arrester 42.

Figure 11:
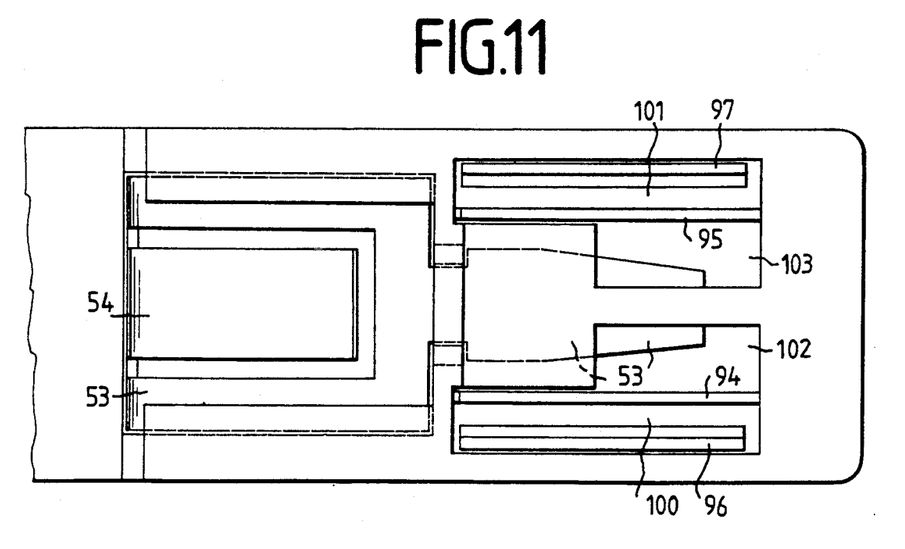
FIG. 11 is a top view of the protective plug according to the invention.

FIG. 11 shows a top view of the protective plug 99. There are shown the contact plates 96, 97, the separating contact plates 94, 95 with the pertinent hollow spaces 100, 101 and the receiving spaces 102, 103 for receiving the PTC resistors 30, 31 or the varistors 32, 33, resp. The earth plate 53 partially projects over the hollow and receiving spaces 100 to 103, and over the receiving space 107 of the surge arrester 42 with the spring tongue 54. The latter serves for contacting with the earth rail 98, as will be described hereinbelow.

Instead of the varistors 32, 33, voltage-limiting semiconductor elements can be employed. The varistors, the diodes and the other components can be used for modifications of the basic models in the production (modular design).

Figure 12:
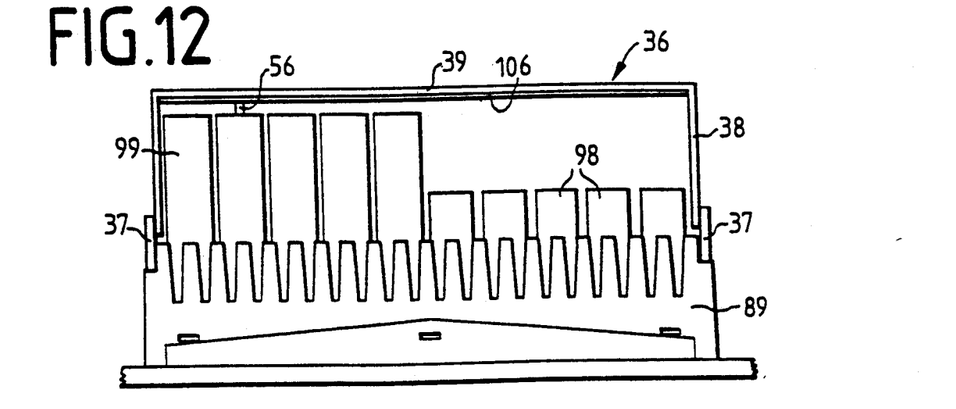
FIG. 12 is a side view of a connector bank according to the invention of a telecommunication sector with five inserted protective plugs, with a mounted earth rail and a set-up signal bracket to be operated by the signalling lugs of the protected plugs.
Figure 13:
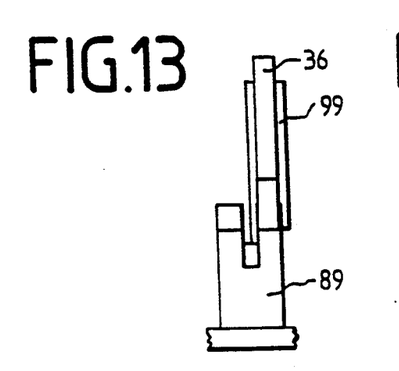
FIG. 13, is a front view of the connector bank according to the invention with inserted protective plugs and signal bracket in not folded-down condition.
Figure 14:
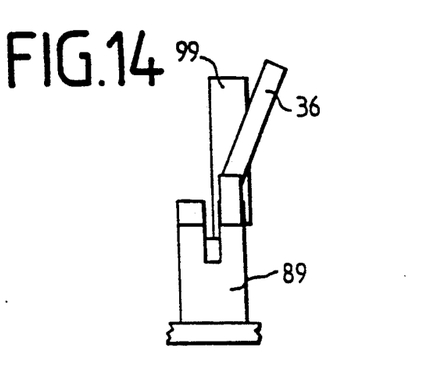
FIG. 14 is a front view according to FIG. 13 with folded-down signal bracket.

FIG. 12 shows a connector block 89 of a telecommunication system with five mounted protective plugs 99 and one earth rail 98. AT both sides of the connector block 89, a U-shaped signal bracket 36 is supported over pivot bearings 37. The legs 38 of the signal bracket 36 are slightly longer than the height of the mounted protective plugs 99 over the connector block 89. The connection piece 39 of the signal bracket 36 is therefore in the active zone of the tripped signalling lugs 56 of the protective plugs 99. On the internal side of the long connection piece 39 of the signal bracket 36, there is provided an electrically conductive contact strip 106. The contact strip 106 is connected over the connection line 17 shown in FIG. 5a to the central signalling system. FIG. 13 shows the front view of the connector block 89 with signal bracket 36 arranged thereupon in operating condition. FIG. 14 shows the front view according to FIG. 13 with folded-down signal bracket 36, so to be able to replace the protective plugs 99 and to allow for an easy access to the measuring and disconnecting contact. Folding-down of the signal bracket 36 is necessary, since otherwise, the protective plugs 99 could not be pulled out. Folding-down of the signal bracket 36 is also possible in the opposite sense from the one shown in FIG. 14. If further connector blocks 89 are provided, on the one side of the shown connector block 89 with mounted protective plug 99, folding-down of the signal bracket would be obstructed.

In FIG. 12, there is shown a protective plug 99 with projecting signalling lug 56. This means that due to an interference with subsequent heating, the solder connection 44 has been desoldered, and the slider 45 has been pushed out from the housing 40, under the action of the spring 88. The optical signalling lug 56 now touches the contact strip 106, and closes the signal circuit, according the circuit diagram shown in FIG. 5a, against the earth conductor E. An additional signalling is also imaginable by closing the signal circuit according to FIG. 5a, even when the signal bracket 36 is folded down according to FIG. 14. This would avoid an inadmissible switching-off of the signalization by a folded-down signal bracket 36. i.e. already during folding-down of the signal bracket 36, a signal is given by a non-shown contact. The signal bracket 36 itself may incorporate a signalling element, e.g. an LED, a lamp or the like, in order to facilitate tracing a fault.

While specific embodiments of the invention nave been shown and described in detail to illustrate the application of the principles of the invention, it will be understood that the invention may be embodied otherwise without departing from such principles.

What is claimed is:

1. A protective device for protecting a user from an overcurrent situation for telecommunication installations, comprising: a line connection between a line side and system side; a fuse connected into said line connection in series; an earth conductor; a surge arrester forming a cross path between said line connection and said earth conductor; a heat-sensitive protection device for protecting said surge arrestor, said heat-sensitive protection device causing disconnection of said cross path of said surge arrestor in response to heat exceeding the defined threshold and closing a short-circuit cross path between said line connection and said earth conductor, on the system side of said fuse, wherein said cross path of said surge arrestor and said short-circuit cross path are provided on a system side of said fuse, and said fuse is bridged by a switch element, said switch element being disconnected when disconnecting said cross path of said surge arrestor.

2. A protective device for protecting a user from an overcurrent situation for telecommunication installations, comprising: a line connection between a line side and system side; a fuse connected into said line connection in series; an earth conductor; a surge arrestor forming a cross path between said line connection and said earth conductor; a heat-sensitive protective device for protecting said surge arrestor, said heat-sensitive protection device causing disconnection of said cross path of said surge arrestor in response to heat exceeding the defined threshold and closing a short-circuit cross path between said line connection and said earth conductor, on the system side of said fuse; a fine protection circuit connected to said line connection for achieving a stage-type protection composed of coarse protection and fine protection.

3. A protective device in accordance with claim 2, wherein:
said fine protection circuit has a PTC resistor connected into said line connection in series, a varistor connected between said line connection and said earth conductor, said varistor thermally coupled to said PCT resistor.

4. A protective device for protecting a user from an overcurrent situation for telecommunication installations, comprising: a line connection between a line side and system side; a fuse connected into said line connection in series; an earth conductor; a surge arrestor forming a cross path between said line connection and said earth conductor; a heat-sensitive protection device for protecting said surge arrestor, said heat-sensitive protection device causing disconnection of said cross path of said surge arrestor in response to heat exceeding the defined threshold and closing a short-circuit path between said line connection and said earth conductor, on the system side of said fuse, wherein said surge arrestor is supported in a housing and has an earth plate; said heat sensitive device is supported in said housing and has a slider connected to said earth plate by a fusible connection, said heat sensitive device also having a spring biasing said slider away from said earth plate, and disconnecting said slider from said earth plate when said heat exceeds said defined threshold thus disconnecting said cross path, and said slider moving into contact with said earth conductor for said closing of said short-circuit path between said line connection and said earth conductor.

5. A protective device according to claim 4, wherein said slider is formed of two slider portions, each slider portion having an L-shaped cross-section, said slider portions combining to form a T-shaped slider, including two long legs forming a cross piece, said long legs being slightly pre-tensioned relative to each other, said long legs forming a V-shaped spring, said slider portions including said short legs forming a flange, each of said short legs including a contact projection, and inside of said long legs forming said cross piece, outwardly directed contact projections being attached to an outside of said long legs.

6. A protective device according to claim 5, wherein said housing is closed on one side by a circuit board, said circuit board having an end defining a contact tongue projecting over said housing, said contact tongue comprising contact positions on each side of said circuit board and circuit tracks provided on a side of said circuit board facing an inside of said housing.

7. A protective device according to claim 6, wherein said fuse is provided on said circuit board as a narrow section of said circuit tracks.

8. A protective device according to claim 4, wherein said slider comprises a signalling lug extendable through an opening in said housing, said signalling lug projecting, after tripping of a fuse, outwardly through said opening of said housing to provide a tripping signal.

9. A protective device according to claim 8, further comprising a signal bracket positioned at a spaced location from a transverse wall of said protective plug for being brought into contact with said signalling lug, said signal bracket including a contact strip for delivering a signal to a signalling device.

10. A protective device according to claim 9, wherein said signal bracket is provided as a U-shaped member connected to a connector block by connection legs and pivot bearings for pivoting said signal bracket with respect to said connector block.

11. A protective device according to claim 4, where a varistor, a contact plate, a PTC resistor and one external contact are provided on each side of said slider, said varistor, said contact plate, said PTC resistor and said external contact being all electrically connected with each other.

12. A protective device according to claim 4, wherein said housing includes an opening for introducing an earthrail, said earthrail being contacted in an interior of said housing by a spring element.

13. A protective device according to claim 4, wherein said housing includes a housing wall, said slider including a signalling lug adjacent said housing wall, said housing wall defining an opening for introducing a measuring and disconnecting plug, said measuring and disconnecting plug lifting, in an interior of said housing, a spring contact connecting an incoming circuit track behind a PTC resistor with an outgoing circuit track and disconnecting said spring contact from said outgoing circuit track.

14. A protective device in accordance with claim 4, wherein:
   said fuse is supported in said housing;
   said housing has contact areas; and
   a connector block means for slidably engaging said housing and connecting said contact areas to said line side and said system side.

* * * * *